United States Patent
Lakshmi et al.

(10) Patent No.: US 12,026,372 B2
(45) Date of Patent: Jul. 2, 2024

(54) RUNTIME STORAGE CAPACITY REDUCTION AVOIDANCE IN SEQUENTIALLY-WRITTEN MEMORY DEVICES

(71) Applicant: Micron Technology, Inc., Boise, ID (US)

(72) Inventors: Vinay Vijendra Kumar Lakshmi, Karnataka (IN); Vijaya Janarthanam, Karnataka (IN)

(73) Assignee: Micron Technology, Inc., Boise, ID (US)

( * ) Notice: Subject to any disclaimer, the term of this patent is extended or adjusted under 35 U.S.C. 154(b) by 62 days.

(21) Appl. No.: 17/976,241

(22) Filed: Oct. 28, 2022

(65) Prior Publication Data
US 2024/0143170 A1   May 2, 2024

(51) Int. Cl.
*G06F 12/00* (2006.01)
*G06F 3/06* (2006.01)

(52) U.S. Cl.
CPC ............ *G06F 3/0608* (2013.01); *G06F 3/064* (2013.01); *G06F 3/0653* (2013.01); *G06F 3/0659* (2013.01); *G06F 3/0679* (2013.01)

(58) Field of Classification Search
CPC ...... G06F 3/0608; G06F 3/064; G06F 3/0653; G06F 3/0659; G06F 3/0679; G06F 12/0238; G06F 12/16; G06F 11/07; G06F 2212/72
See application file for complete search history.

(56) References Cited

U.S. PATENT DOCUMENTS

| | | | | |
|---|---|---|---|---|
| 9,477,587 | B2 * | 10/2016 | Wong | G06F 3/0604 |
| 11,373,729 | B2 * | 6/2022 | Liu | G11C 29/886 |
| 11,556,479 | B1 * | 1/2023 | He | G06F 12/0893 |
| 11,605,439 | B2 * | 3/2023 | Bhardwaj | G11C 29/44 |

* cited by examiner

Primary Examiner — Shawn X Gu
(74) Attorney, Agent, or Firm — Lowenstein Sandler LLP (57) ABSTRACT

A system includes a memory device having a plurality of blocks. A first subset of the plurality of blocks is configured as single-level cell (SLC) memory and a second subset of the plurality of blocks is configured as multi-level cell (MLC) memory. A processing device, operatively coupled to the memory device, determines that a first block of a set of blocks of the first subset is a bad block. The processing device converts a second block of the set of blocks to the MLC memory of the second subset, wherein the second block is located in a neighboring plane of the memory device from that of the first block. The processing device converts a media endurance metric value of the second block from SLC-type to MLC-type.

20 Claims, 6 Drawing Sheets

```
┌─────────────────────────────────────────────────────────┐
│ Access a memory device having multiple blocks, where a  │
│ first subset of the multiple blocks is configured as    │
│ single-level cell (SLC) memory and a second subset of   │
│ the multiple blocks is configured as multi-level        │
│ cell (MLC) memory 410                                   │
└─────────────────────────────────────────────────────────┘
                            │
                            ▼
┌─────────────────────────────────────────────────────────┐
│ Determine that a first block of a set of blocks of the  │
│ first subset is a bad block 420                         │
└─────────────────────────────────────────────────────────┘
                            │
                            ▼
┌─────────────────────────────────────────────────────────┐
│ Convert a second block of the set of blocks to the MLC  │
│ memory of the second subset 430                         │
└─────────────────────────────────────────────────────────┘
                            │
                            ▼
┌─────────────────────────────────────────────────────────┐
│ Convert a media endurance metric value of the second    │
│ block from SLC-type to MLC-type 440                     │
└─────────────────────────────────────────────────────────┘
```

```
┌─────────────────────────────────────────────────────────┐
│ Detect an MLC block of the second subset has failed 450 │
└─────────────────────────────────────────────────────────┘
                            │
                            ▼
┌─────────────────────────────────────────────────────────┐
│ Assign the converted MLC block to be a target block for │
│ relocating data stored at the MLC block, to avoid a     │
│ zone of memory that includes thee MLC block from going  │
│ offline 460                                             │
└─────────────────────────────────────────────────────────┘
```

RUNTIME STORAGE CAPACITY REDUCTION AVOIDANCE IN SEQUENTIALLY-WRITTEN MEMORY DEVICES

TECHNICAL FIELD

Embodiments of the disclosure relate generally to memory sub-systems, and more specifically, to runtime storage capacity reduction avoidance in sequentially-written memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
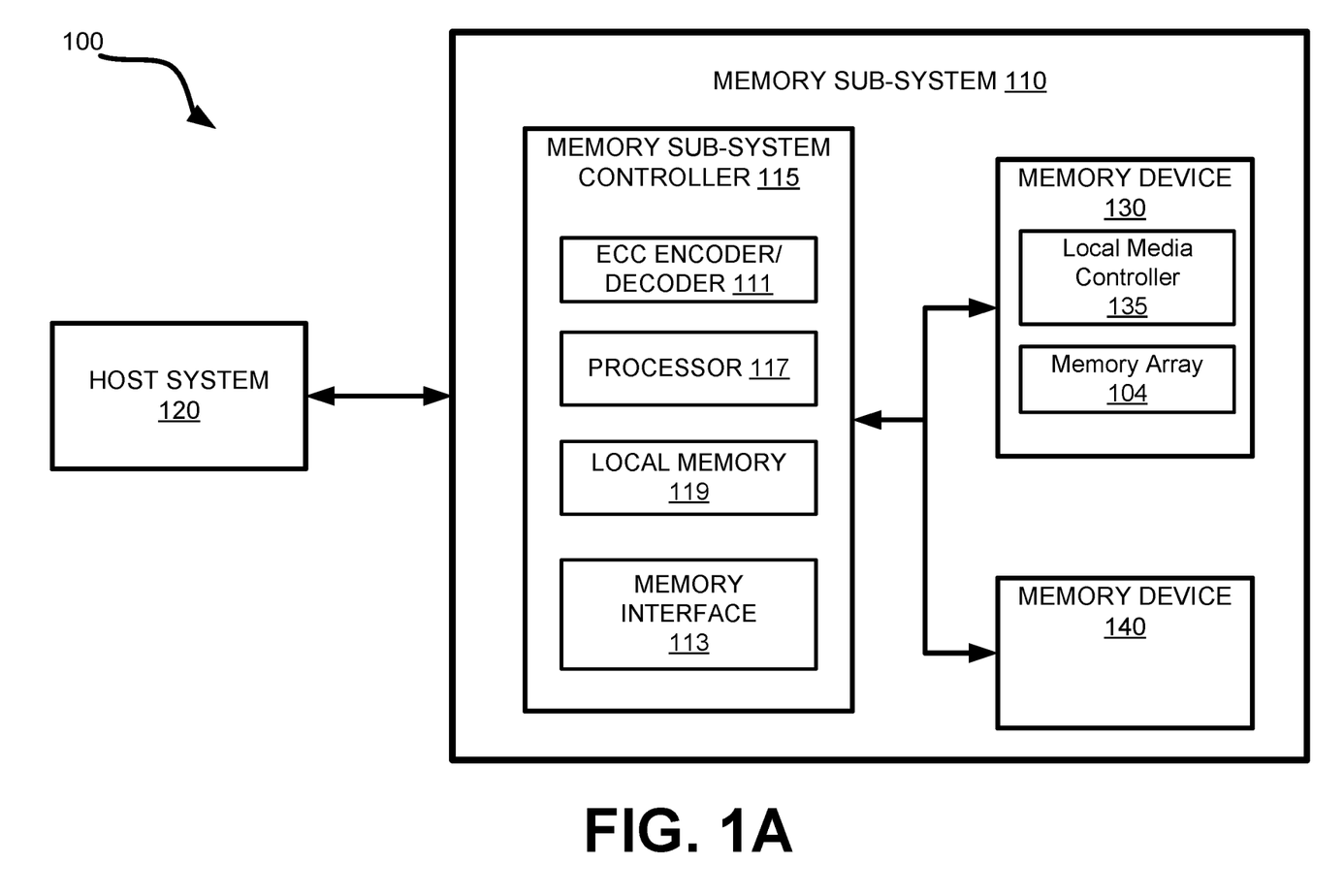
FIG. 1A illustrates an example computing system that includes a memory sub-system according to embodiments.

Aspects of the present disclosure are directed to runtime storage capacity reduction avoidance in sequentially-written memory devices. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory devices can be non-volatile memory devices that can store data from the host system. One example of a non-volatile memory device is a NOT-AND (NAND) memory device. Other examples of non-volatile memory devices are described below in conjunction with FIG. 1. Each of the memory devices can include one or more arrays of memory cells that are organized in physical blocks of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1," or combinations of such values. One type of memory cell, for example, single level cells (SLC) can store one bit per cell. Other types of memory cells are multi-level cells (MLCs) and store multiple bits per cell, including bi-level cell (BLCs), which store two bits per cell, triple-level cells (TLCs), which store three bits per cell, quad-level cells (QLCs), which store four bits per cell, and penta-level cells (PLCs), which store five bits per cell. Thus, although MLCs are referred to sometimes as storing two bits per cell, for clarity herein, "MLC" is used to refer to BLCs, TLCs, QLCs, and PLCs (e.g., two or more bits per cell). Memory devices can include one or more arrays of memory cells such as SLCs and MLCs. For example, a particular memory device can include an SLC portion and a BLC portion, a TLC portion, a QLC portion, or a PLC portion of memory cells.

Various access operations can be performed on the memory cells. For example, data can be written to, read from, and erased from memory cells. Memory cells can be grouped into a write unit, such as a page. For some types of memory devices, a page is the smallest write unit. A page is a set of cells across the same word line. A page size represents a particular number of cells of a page. For some types of memory devices (e.g., NAND), memory cells can be grouped into an erase unit, such as a physical unit, e.g., a physical block, which is a group of pages. A physical block is a 2-dimensional memory array of pages (rows of cells) and strings (columns of cells). Data can be written to a block, page-by-page. Data can be erased at a block level. However, portions of a block cannot be erased. Multiple blocks can be grouped together to form a plane. One or multiple planes can be grouped together to form a physical die of the memory device. A memory device can include one or more dice. A single die or multiple die stacked on top of each other can be grouped to form a package. A die is also hereinafter referred to as a logical unit (LUN). A LUN can contain one or more planes.

A memory sub-system can use a striping scheme to treat various sets of data as units when performing data operations (e.g., write, read, erase). A LUN stripe is a collection of planes that are treated as one unit when writing, reading, or erasing data. Each plane in a LUN stripe can carry out the same operation, in parallel, of all of the other planes in the LUN stripe. A block stripe is a collection of blocks, one from each plane in a LUN stripe, that are treated as a unit. The blocks in a block stripe have the same block identifier (e.g., block number) in their respective planes. A block stripe (also hereinafter referred to as a block set) can be a set of blocks arrayed across planes of different dice, such that the blocks are grouped together for purposes of data storage. Writing to block stripes is so that more data can be concurrently written and read at the same time across multiple dice. Multiple blocks of a block set can be identified as a data group.

A host file system can group data by locality and write the data sequentially to the memory devices of the memory sub-system. File systems can then write data of different localities as parallel sequential streams to memory devices, each stream having its own locality. "Locality" can refer to either temporal locality or spatial locality. Data having temporal locality is data that a processor tends to access at the same locations in a memory device repetitively over a short period of time, e.g., data written, over-written, and trimmed around the same time. Data having spatial locality captures the data retrieval patterns of when a particular location is referenced at a particular time, then it is likely that nearby locations will be referenced in the near future. In this case, a processor can attempt to determine the size and shape of the area around the currently referenced location for which it is worthwhile to prepare for faster access for subsequently referenced locations. Reference to sequential locality is a special case of spatial locality that occurs when data elements are arranged and accessed linearly, such as in traversing the elements in a one-dimensional array.

The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Most memory sub-system controllers (e.g., processing devices) write to memory devices randomly in small chunks of data (e.g., 4 KB), and then use large amounts of metadata to map LBA space to the physical address space of the memory devices. When a larger group of data (e.g., 100 MB or more) is written that has data locality, however, the "data group" can be sequentially written as a larger chunk to one or more block sets across multiple dice. In order to simplify mapping of such data groups, LBAs of a zone (e.g., logical address space associated with a data group) can be sequentially ordered within the LBA space and be mapped to sequentially ordered physical addresses within the physical address space. In other words, the data group can be associated with a logical block address (LBA) space zone having multiple sequential LBAs that are sequentially mapped to multiple sequential physical addresses. Memory sub-systems that can write zones of data at a time and map the zones accordingly can be said to operate in zone namespace (ZNS), e.g., where a zone of logical addresses are named/identified as a group. Advantageously, use of ZNS for logical-to-physical (LTP) address mapping greatly reduces the amount of metadata to track the LTP mapping.

In certain zoned namespace MLC-based memory devices (which often have portions configured as QLC memory), most of the memory is exposed to the host. Thus, MLC blocks are mapped to a specific zone, so when an MLC block fails, the MLC block can lead to changing the state of the zone to offline, e.g., not being used during runtime. This causes a loss of runtime storage capacity during program/erase operations, e.g., referred to herein as "runtime," which can also include read operations among other activities.

In these memory devices, SLC blocks from two neighboring planes are paired as a block set (e.g., a set of blocks), are used as cache to fill a zone of MLC blocks, and are thus flushed to the MLC memory in a writing process referred to as folding. When a memory device boots up and an SLC block of an SLC block set goes bad, the neighboring SLC block is paired to the SLC block and so both SLC blocks of the block set are added to a bad block list and retired. The neighboring SLC block, therefore, although being capable of supporting additional program/erase cycle (PEC) count, is retired because the paired set of blocks have corresponding addresses and are treated as a pair for purposes of ZNS mapping in at least some memory devices. In these memory devices, for example, even the good SLC block remains unused throughout the lifetime of the memory device. This creates an issue in ZNS memory devices, because once there are no more spare MLC (e.g., QLC) blocks and SLC blocks, zones are taken offline reflecting runtime storage device capacity reduction of the memory device.

Aspects of the present disclosure address the above and other deficiencies through implementing runtime storage capacity reduction avoidance in memory devices such as ZNS memory devices. Although similar approaches may be implemented in any memory device to avoid loss of usable blocks of memory over time, the methods described herein may have a greatest impact in memory devices that are sequentially written and/or those where neighboring SLC blocks of a block set are both added to a bad block list when either SLC block is designated as a bad block.

For example, in some embodiments, the memory sub-system controller (e.g., processing device) can, during runtime, determine that an SLC block in a block set is a bad block, e.g., a grown bad block (GBB), a manufactured bad block (MBB), or other type of bad block. In some cases, this is performed by accessing a bad block list or detecting that the SLC block meets particular criteria for being considered a bad block, which will be discussed in more detail. The processing device can further convert the neighboring SLC block in the block set to an MLC block, e.g., by erasing the neighboring SLC block as MLC memory and thus configuring the neighboring SLC block to be programmable as MLC memory (e.g., configured as one of BLC, TLC, QLC, or PLC memory). The processing device can also convert a media endurance metric value of the neighboring block from SLC-type to MLC-type, e.g., so that the endurance capacity of the converted MLC block can be accurately tracked over time, and thus avoid using the converted MLC block into any unacceptable bit error rates.

In some embodiments, the media endurance metric value that is tracked over time is a PEC value. For example, SLC blocks having been used for a certain number PECs have an SLC-type PEC. In at least some embodiments, to convert an SLC block to an MLC block during runtime, the SLC-type PEC is converted to an MLC-type PEC. Blocks that reach an end of life (EOL) PEC cannot be programmed further and are put into a read-only mode to prevent over-wearing of the memory cells that should be retired. Incorrectly tracking PEC can thus lead to data loss when a block is over-programmed and fails.

Advantages of the present disclosure include but are not limited to improved performance in and longevity of memory devices that are written sequentially and/or that jointly add paired blocks in a block set across planes to a bad block list. Converting some of the paired SLC blocks, which are not bad blocks, in memory devices to MLC blocks counteracts runtime storage capacity reduction by reincorporating such blocks into overall configured MLC memory. Where a zone that includes the converted MLC block might go into an offline state due to some failure in an MLC block assigned to that zone, SLC blocks converted to MLC blocks can be used as a target block for relocating data and avoids the zone going offline. These and other advantages will be discussed hereinafter, as would be apparent to those skilled in the art of media management.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such. Each memory device 130 or 140 can be one or more memory component(s).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include NOT-AND (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of MLC memory cells, such as bi-level cells (BLCs), triple-level cells (TLCs), quad-level cells (QLCs), and penta-level cells (PLCs) can store multiple bits per cell. In some embodiments, each of the memory devices 130 can include one or more arrays of memory cells such as SLCs, BLCs, TLCs, QLCs, PLCs or any combination of such. In some embodiments, a particular memory device can include an SLC portion, and an BLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOT-OR (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 are managed memory devices, which is a raw memory device combined with a local controller (e.g., the local media controller 135) for memory management within the same memory device package or memory die. An example of a managed memory device is a managed NAND (MNAND) device. Memory device 130, for example, can represent a single die or multiple dice having some control logic (e.g., local media controller 135) embodied thereon. In some embodiments, one or more components of the memory sub-system 110 are omitted.

In some embodiments, the controller 115 includes an error-correcting code (ECC) encoder/decoder 111. The ECC encoder/decoder 111 can perform ECC encoding for data written to the memory devices 130 and ECC decoding for data read from the memory devices 130, respectively. The ECC decoding can be performed to decode an ECC codeword to correct errors in the raw read data, and in many cases also to report the number of bit errors in the raw read data.

In various embodiments, the controller 115 includes a memory interface component 113. The memory interface component 113 is responsible for handling interactions of the memory sub-system controller 115 with the memory devices of the memory sub-system 110, such as the memory device 130. For example, the memory interface component 113 can send memory access commands corresponding to requests received from the host system 120 to the memory device 130, such as program commands, read commands, or other commands. In addition, the memory interface component 113 can receive data from the memory device 130, such as data retrieved in response to a read command or a confirmation that a program command was successfully performed. In some embodiments, the memory sub-system controller 115 includes at least a portion of the memory interface 113. For example, the controller 115 can include a processor 117 (e.g., a processing device) configured to execute instructions stored in the local memory 119 for performing the operations described herein. In some embodiments, the memory interface component 113 is part of the host system 120, an application, or an operating system.

In some embodiments, the memory device 130 includes the local media controller 135 and a memory array 104 coupled to the local media controller 135. As discussed herein, the memory array 104 may include multiple blocks of memory cells, some of which are configured differently. In at least some embodiments, the multiple blocks of memory cells include a first subset of the plurality of blocks that is configured as single-level cell (SLC) memory and a second subset of the plurality of blocks is configured as multi-level cell (MLC) memory, e.g., as BLC, TLC, QLC, or PLC memory. The memory interface 113 may be configured to control the detection of bad blocks within neighboring SLC block pairs, convert good blocks of the neighboring SLC block pairs to MLC memory, and convert a media endurance metric value (e.g., PEC value) of the converted MLC block from SLC-type to MLC-type.

Figure 1B:
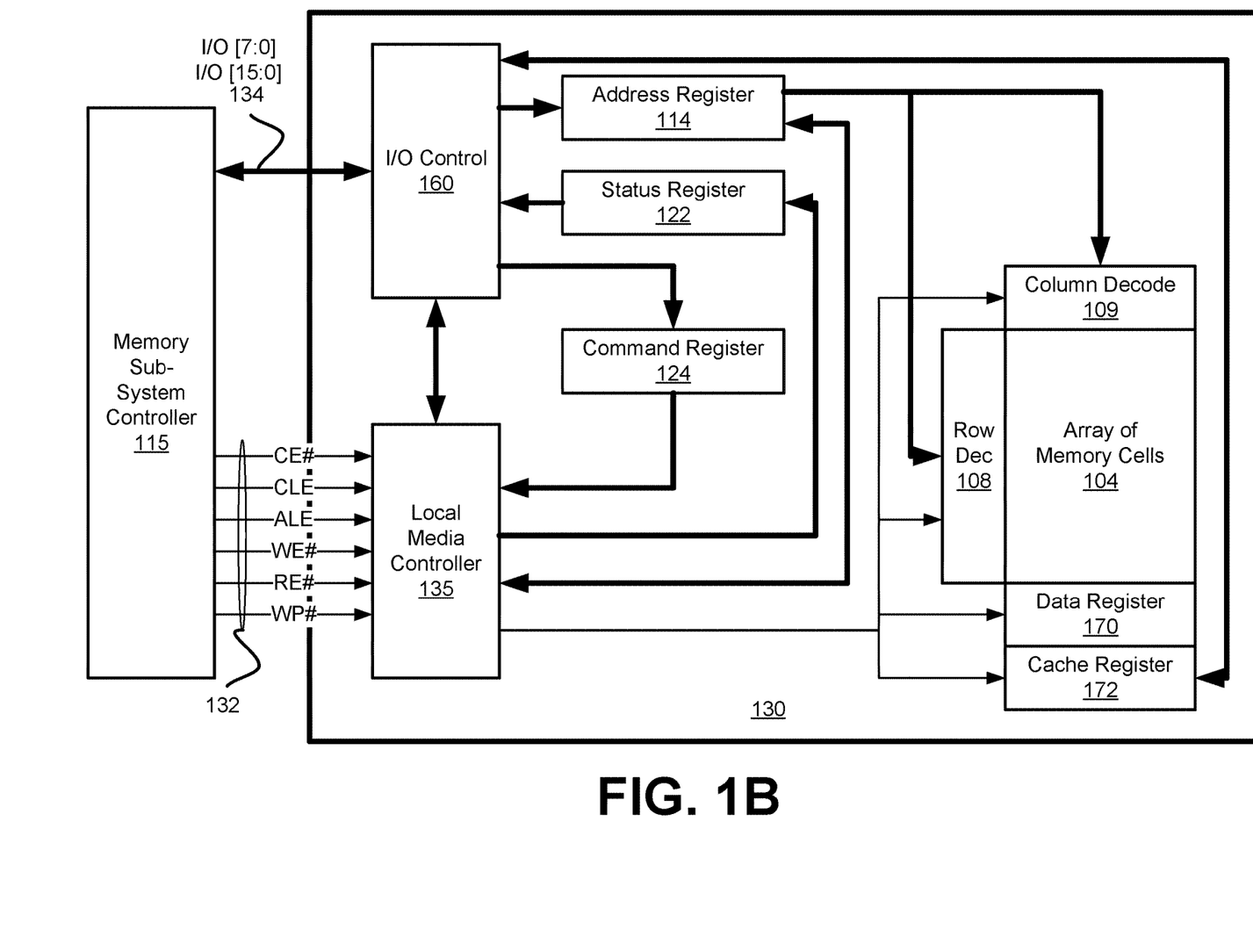
FIG. 1B is a block diagram of a memory device in communication with a memory sub-system controller of a memory sub-system, in accordance with some embodiments.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses. In one embodiment, local media controller 135 can perform a double single-level cell (SLC) program operation to concurrently (i.e., at least partially overlapping in time) program memory cells in two or more separate sub-blocks of a block of memory array 104 using a single programming pulse.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands may be received over input/output (I/O) pins [7:0] of I/O bus 134 at I/O control circuitry 160 and may then be written into command register 124. The addresses may be received over input/output (I/O) pins [7:0] of I/O bus 134 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
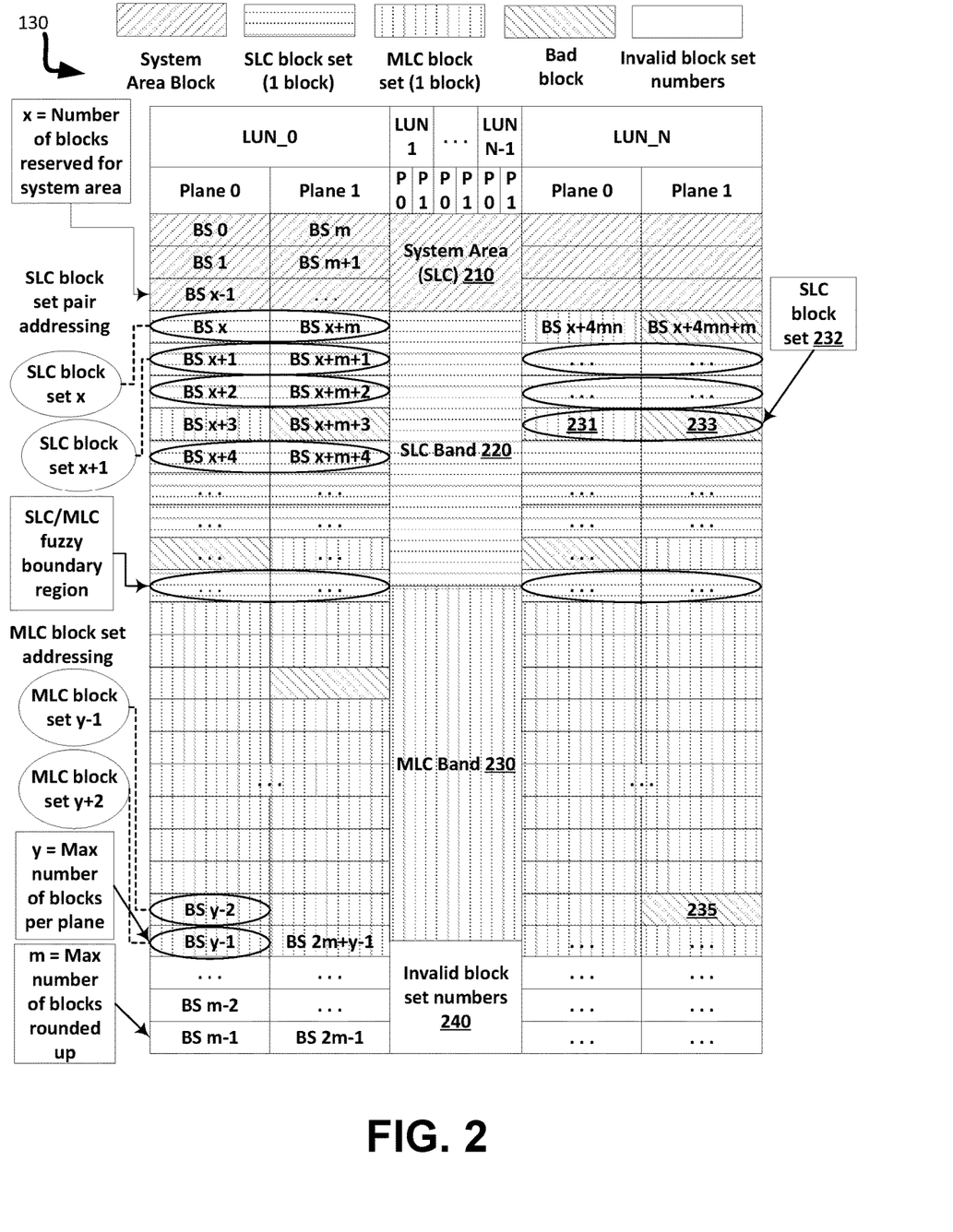
FIG. 2 is a block diagram of a block set-based depiction of a memory device, illustrating block-set identification across planes according to various embodiments.

FIG. 2 is a block diagram of a block set-based depiction of the memory device 130 (FIGS. 1A-1B), illustrating block-set identification across planes according to various embodiments. In these embodiments, the memory device 130 includes multiple LUNs (or dice) labeled as LUN_0-LUN_N, where each LUN includes multiple planes. Only a first plane (Plane 0) and a second plane (Plane 1) are illustrated in each LUN for simplicity of explanation. As illustrated, cross sections of these multiple planes across the LUNs include a system area 210, an SLC band 220, an MLC band 230, and an invalid block set numbers area 240. The system area 210 is typically SLC memory and contains memory reserved for use by the host system 120. The SLC band 220 is an area configured as SLC memory dedicated to use as cache. The MLC band 230 is configured as one of BLC, TLC, QLC, or PLC memory and to which data in the SLC band 220 (cache) is folded for more permanent storage. A transition area between the SLC band 220 and MLC band 230 may be a fuzzy boundary region in which the blocks can be configured as SLC or MLC memory.

In some embodiments, the controller 115 addresses block sets (or sets of blocks) as pairs of physical blocks that are neighboring blocks, e.g., have a corresponding address in each of two neighboring planes within the SLC band 220 of the memory device 130. In some embodiments, the controller 115 detects a first block in an SLC block set 232 as a bad block 233, illustrated and labeled in LUN_N only for purposes of explanation. A "bad block" herein refers to a block that is no longer reliable for storing or retrieving data, for example, due to a defect (e.g., manufacturing defect) or due to wear. A manufactured bad block (MBB) is unreliable due to such a defect and may already be listed in a bad block list (or look up table). A grown bad block (GBB) refers to a bad block being unreliable due to wear and can be identified based on a threshold. In some embodiments, for example, GBBs are identified as having one or more invalid bits whose reliability is not guaranteed. This level of reliability may be determined, for example, by the bad block dropping below a bit error rate (BER) threshold designated as the point of wear below which there exists unacceptable unreliability. Other ways of detecting a GBB include failure of the block to fully or properly be erased, as described below, and/or failure to read data out of the block, e.g., attempting a read operation results in a uncorrectable data read error. When a block is detected as GBB, the block may also be listed in the bad block list or table.

The controller 115 may then be able to determine that a particular block is bad during runtime by accessing the bad block list or table. Although beyond the scope of this application in terms of implementation, the controller 115 can also direct that certain codes or data patterns be stored in (or be absent from) particular byte areas of GBBs (that vary based on being an SLC block or an MLC block), which may also signal to the controller 110 or the local media controller 135 that the block is bad, e.g., in real time upon attempted access to the bad block.

In at least some embodiments, the data stored in one or more memory cells of bad blocks may fail to be properly erased during an erase operation due to the damage, defects, and/or normal wear over time of the memory cells. Examples of commands that perform such a block erase operation include a sanitize block erase command and a security erase command to erase stored data from the memory sub-system 110. In such a situation, the memory sub-system 110 can receive an error code indicating an error in erasing one or more blocks of a memory component included in the memory sub-system 110. Failure to fully sanitize blocks of memory carries security risks where an attacker can physically remove the memory component that includes the bad block(s) to directly access the data on the memory component, including any remaining data that could not be fully erased. In one embodiment, the attacker can also use a diagnostic port to try to retrieve such data. Thus, GBBs can include blocks that are either no longer reliable or may pose security risk, and are determined by detecting a failure to fully or properly be erased.

In some embodiments, the controller 115 causes the bad block 233 to be taken offline during runtime, e.g., during normal activity of the controller 215 in directing memory operations such as erase, program, and read operations. This can include adding the bad block 233 or a bad blocks list that indicates to the controller 115 that the bad block 233 is not useable for inclusion any zone. In typical memory devices, the neighboring (or paired) second block 231 of the SLC block set 232 is also taken offline and can cause an entire zone of the memory device 130 to also be taken offline during runtime operation of the memory device 130, which is not desired and is discussed in more detail with reference to FIG. 3.

In various embodiments, the controller 115 further converts the second block 231 of the SLC block set 232 (or set of blocks) to an MLC block, e.g., by erasing the second block 231 as MLC memory, and thus configuring the second block 231 of the SLC block set 232 to be programmable as MLC memory (e.g., configured as one of BLC, TLC, QLC, or PLC memory). For example, in embodiments, a specific set of commands include an SLC erase command and a separate MLC erase command. If a block is to be used in SLC mode, then the controller 115 causes an SLC erase to be performed before storing data to the block. Similarly, if a different block needs is to be used in MLC mode, then controller 115 causes this different block to be erased in MLC mode before storing data to the different block. Also, consider that an SLC Block may contain X number of cells, where BLC has 2X number of cells, and TLC has 3X number of cells, and so forth. Usage of respective block type erase enables erasing X number of cells (SLC mode), 2X number of cells (BLC mode), or 3X number of cells (TLC mode). The controller 115 can also convert a media endurance metric value of the converted MLC block 231 from SLC-type to MLC-type, e.g., so that the endurance capacity of the converted MLC block 231 can be accurately tracked over time, and avoid using the converted MLC block 231 into any unacceptable bit error rates.

In some embodiments, the controller 115 detects that an MLC block 235 within the MLC band 230 has failed. The controller can assign the converted MLC block 231 of the SLC block set 232 to be a target block for relocating data stored at the MLC block 235, thus avoiding a zone of memory that includes the MLC block from going offline.

Figure 3:
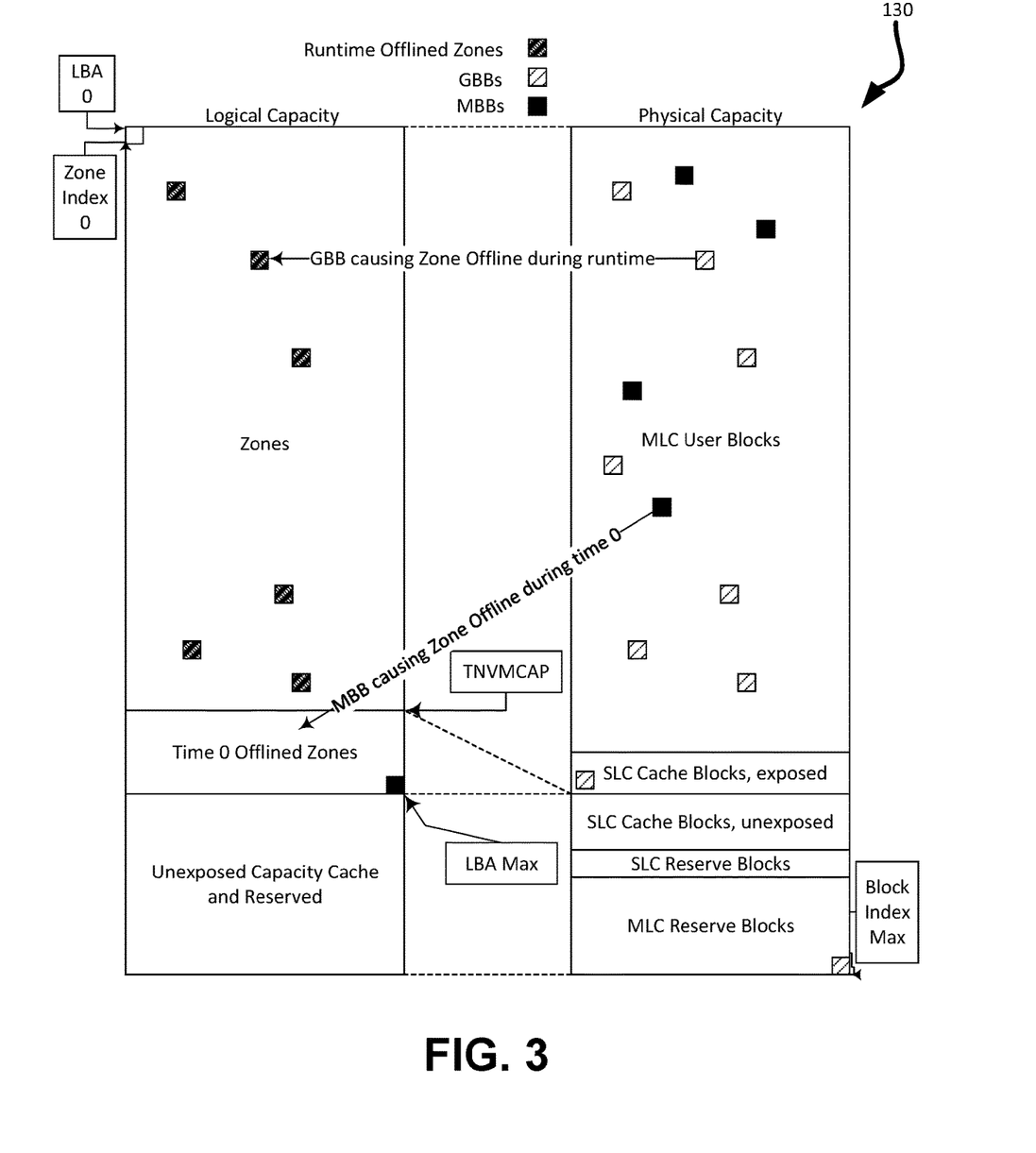
FIG. 3 is a block diagram of conversion of zones to runtime offline zones within the memory device, according to various embodiments.

FIG. 3 is a block diagram of conversion of zones to runtime offline zones within the memory device 130, according to various embodiments. As illustrated, the controller 115 maps logical capacity of virtual addresses against physical capacity of physical blocks of the memory device 130. As discussed previously, these physical blocks can sometimes be determined or detected as bad blocks, e.g., as MBBs that are detectable as bad blocks immediately upon startup, or as GBBs, which go bad due to wear or other developed defects during use. Because, in ZNS memory devices, larger sequential ranges of the LBA address space are sequentially mapped to larger ranges of the MLC address space (which requires a certain amount of SLC configured cache from which data is folded into the MLC address space), sufficient SLC blocks and/or MLC blocks that are bad blocks can render an entire zone of the LBA address space (logic capacity) unusable. For example, the zone may be rendered unusable because the zone maps to a range of physical address space that is no longer reliably useful to store data due to bad blocks located within that range of physical address space.

In embodiments, the controller 115 takes an unusable zone offline during runtime due to detecting a sufficient number of GBBs within the physical address space to which the zone maps. Eventually, when enough zones are taken offline, the entire memory device 130 reaches an end of life (EOL) and is retired. The present system and method, which are discussed above and summarized in FIGS. 4A-4B, work to avoid the premature taking offline of any given zone, effectively also extending the useful life of the memory device 130. For example, by converting SLC blocks that are still good to MLC blocks, which can become "MLC reserve blocks," retired MLC blocks can be replaced by these MLC reserve blocks. The controller 115 can thus be configured to swap out certain MLC blocks with a zone with MLC converted blocks that are physically located within the SLC band 220 of cache memory.

Figure 4A:
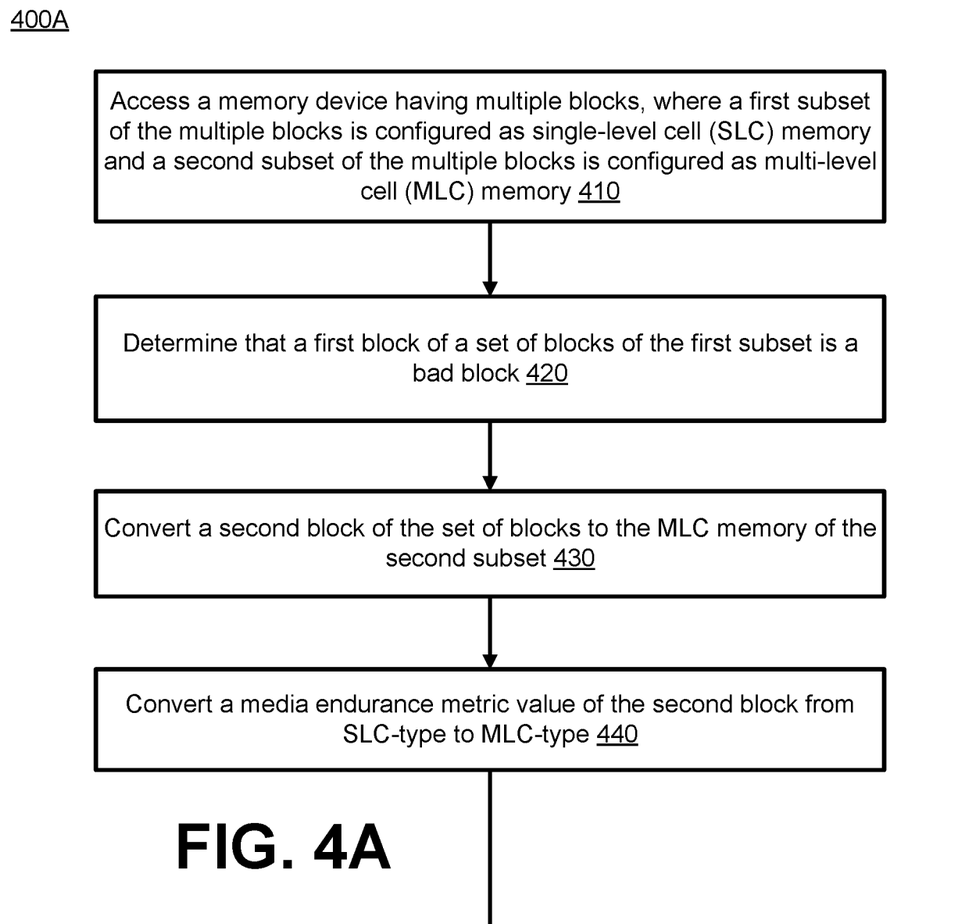
FIG. 4A is a flow chart of a method for runtime storage capacity reduction avoidance in sequentially-written memory devices according to various embodiments.

FIG. 4A is a flow chart of a method 400A for runtime storage capacity reduction avoidance in sequentially-written memory devices according to various embodiments. The method 400A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400A is performed by the controller 115 (e.g., the memory interface 113) and/or the local media controller 135 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic accesses a memory device having multiple blocks. In the memory device, according these embodiments, a first subset of the multiple blocks is configured as SLC memory and a second subset of the multiple blocks is configured as MLC memory. In this or any other embodiment, MLC memory can be one of multi-level cell (MLC) memory or bi-level cell (BLC) memory, triple-level cell (TLC) memory or 3-bit MLC memory, quad-level cell (QLC) memory, or penta-level (PLC) memory.

At operation 420, processing logic determines that a first block of a set of blocks of the first subset is a bad block. For example, the processing logic determines the first block is a bad by determining that the first block is one of a grown bad block or a manufactured bad block.

At operation 430, the processing logic converts a second block of the set of blocks to the MLC memory of the second subset. In these embodiments, the second block is located in a neighboring plane of the memory device from that of the first block. In some embodiments, operation 430 is performed in response to determining that the first block is a bad block in operation 420. In some embodiments, converting the second block to MLC memory is performed by causing an MLC erase operation to be performed on the second block.

At operation 440, the processing logic converts a media endurance metric value of the second block from SLC-type to MLC-type. In some embodiments, the determining of operation 420 and the converting of operations 430 and 440 are performed during runtime while directing program or erase operations to be performed at the memory device. In some embodiments, runtime also includes read operations or other active memory operations performed by the controller 115 at the memory device 130.

In some embodiments, with additional reference to operation 430, the processing logic tracks the media endurance metric value over time as a program/erase count (PEC) value and converting the media endurance metric value includes using an MLC conversion factor to convert a tracked PEC value for the second block from SLC-type PEC to MLC-type PEC. In other embodiments, other media endurance metric values can be employed such as one or a combination of time of life of use of the memory device 130, average temperature of the memory device 130, or other wear-related metrics or values.

In some embodiments, converting the media endurance metric value (e.g. PEC value) includes using the MLC conversion factor to convert a PEC value that has been tracked over time for the second block (231 in FIG. 2) from SLC-type to MLC-type. In some embodiments the MLC conversion factor is one of a BLC conversion factor, a TLC conversion factor, a QLC conversion factor, or a PLC conversion factor. In these embodiments, the MLC conversion factor is calculated as the quotient of an statistical aggregate of SLC EOL PEC value over a statistical aggregate of MLC EOL PEC values. A statistical aggregate may include, for example, an average, a median, maximum, or minimum of PEC values of blocks that have already been retired. Once the MLC conversion factor is known, the conversion from the SLC-type PEC to the MLC-type PEC can be performed by dividing the SLC-type PEC value of the second block by the MLC conversion factor. In other words, the number of PEC counts available to an MLC block is reduced by the MLC conversion factor, e.g., due to the more extensive erase and the multiple writes performed for each PEC of the MLC memory compared to the SLC memory. In some embodiments, there can be a tolerance factor for the MLC conversion factor, which is thus can be seen as an education approximation for any given block set or zone.

Figure 4B:
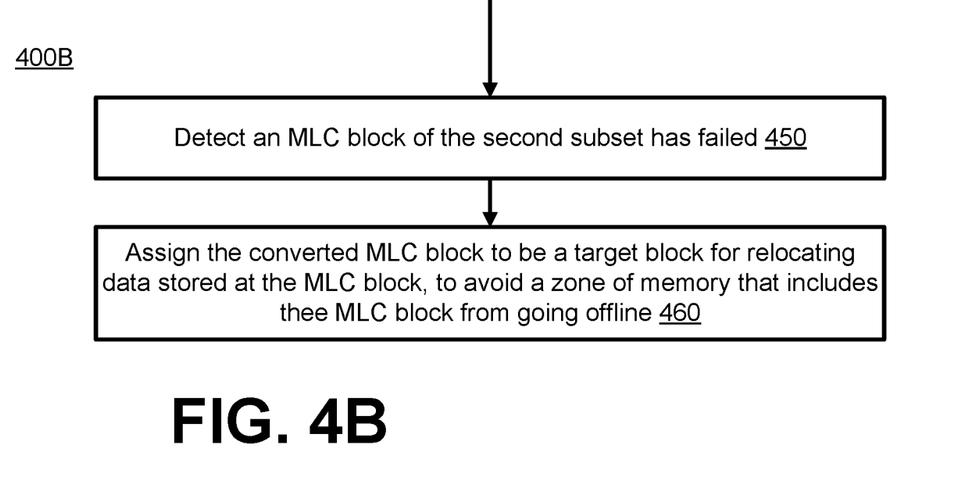
FIG. 4B is a flow chart of an extension to the method of FIG. 4B for reassignment of the converted MLC block to receive data from a failed MLC block according to some embodiments.

FIG. 4B is a flow chart of an extension method 400B to the method of FIG. 4B for reassignment of the converted MLC block to receive data from a failed MLC block according to some embodiments. The method 400B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400A is performed by the controller 115 (e.g., the memory interface 113) and/or the local media controller 135 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 450, the processing logic detects an MLC block of the second subset has failed. The MLC block can be the MLC block 235, referenced as an example in FIG. 2.

At operation 460, the processing logic assigns the converted MLC block to be a target block for relocating data stored at the MLC block. The converted MLC block can be the SLC block 231 that was converted to MLC memory, as illustrated and discussed with reference to FIG. 2.

Figure 5:
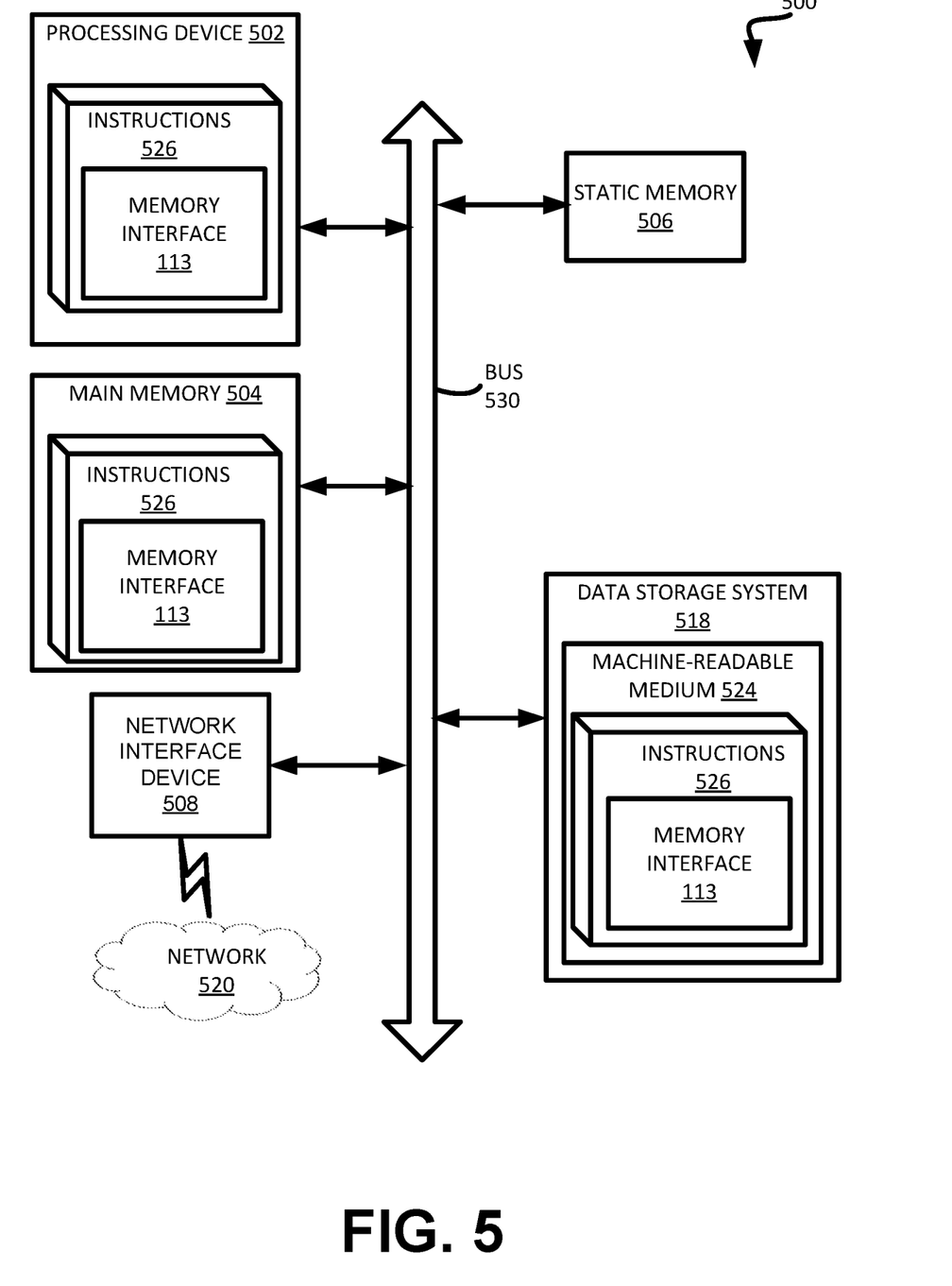
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1A) that includes, is coupled to, or utilizes a memory sub-system (e.g., the memory sub-system 110 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIGS. 1A-1C.

In one embodiment, the instructions 526 include instructions to implement functionality corresponding to the memory interface 113 of FIG. 1A. While the machine-readable storage medium 524 is shown in an example embodiment to be a single medium, the term "non-transitory computer-readable storage medium" should be taken to include a single medium or multiple media that store the one or more sets of instructions. The term "machine-readable storage medium" or "computer-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of blocks, wherein a first subset of the plurality of blocks is configured as single-level cell (SLC) memory and a second subset of the plurality of blocks is configured as multi-level cell (MLC) memory; and
a processing device operatively coupled to the memory device, the processing device to perform operations comprising:
determining that a first block of a set of blocks of the first subset is a bad block;
converting a second block of the set of blocks to the MLC memory of the second subset, wherein the second block is located in a neighboring plane of the memory device from that of the first block; and
converting a media endurance metric value of the second block from SLC-type to MLC-type.

2. The system of claim 1, wherein the determining and the converting the second block and the media endurance metric value are performed during runtime while directing program or erase operations at the memory device.

3. The system of claim 1, wherein converting the media endurance metric value comprising tracking the media endurance metric value over time as a program/erase cycle (PEC) value.

4. The system of claim 3, wherein converting the media endurance metric value comprises using an MLC conversion factor to convert a PEC value for the second block from SLC-type PEC to MLC-type PEC.

5. The system of claim 1, wherein converting the second block to MLC memory comprises causing an MLC erase operation to be performed on the second block.

6. The system of claim 1, wherein determining that the first block is a bad block comprises determining that the first block is one of a grown bad block or a manufactured bad block.

7. The system of claim 1, wherein the determining further comprises determining that the second block is not a bad block.

8. The system of claim 1, wherein the second block is a converted MLC block and the operations further comprise:
detecting an MLC block of the second subset has failed; and
assigning the converted MLC block to be a target block for relocating data stored at the MLC block, to avoid a zone that includes the MLC block from going offline.

9. A method comprising:
accessing, by a processing device, a memory device comprising a plurality of blocks, wherein a first subset of the plurality of blocks is configured as single-level cell (SLC) memory and a second subset of the plurality of blocks is configured as multi-level cell (MLC) memory;
determining that a first block of a set of blocks of the first subset is a bad block;
converting a second block of the set of blocks to the MLC memory of the second subset, wherein the second block is located in a neighboring plane of the memory device from that of the first block; and
converting, by the processing device, a media endurance metric value of the second block from SLC-type to MLC-type.

10. The method of claim 9, wherein the determining and the converting the second block and the media endurance metric value are performed during runtime while directing program or erase operations to be performed at the memory device.

11. The method of claim 9, further comprising tracking the media endurance metric value over time as a program/erase cycle (PEC) value.

12. The method of claim 11, wherein converting the media endurance metric value comprises using an MLC conversion factor to convert a PEC value for the second block from SLC-type PEC to MLC-type PEC.

13. The method of claim 9, wherein converting the second block to MLC memory comprises causing an MLC erase operation to be performed on the second block.

14. The method of claim 9, wherein determining that the first block is a bad block comprises determining that the first block is one of a grown bad block or a manufactured bad block.

15. The method of claim 9, wherein the determining further comprises determining that the second block is not a bad block.

16. The method of claim 9, wherein the second block is a converted MLC block, the method further comprising:
detecting an MLC block of the second subset has failed; and
assigning the converted MLC block to be a target block for relocating data stored at the MLC block.

17. A non-transitory computer-readable storage medium storing instructions, which when executed by a processing device, cause the processing device to perform operations comprising:
accessing a memory device comprising a plurality of blocks, wherein a first subset of the plurality of blocks is configured as single-level cell (SLC) memory and a second subset of the plurality of blocks is configured as multi-level cell (MLC) memory;
determining that a first block of a set of blocks of the first subset is a bad block;
converting a second block of the set of blocks to the MLC memory of the second subset, wherein the second block is located in a neighboring plane of the memory device from that of the first block; and
converting a media endurance metric value of the second block from SLC-type to MLC-type, wherein the determining and the converting the second block and the media endurance metric value are performed during runtime while directing program or erase operations at the memory device.

18. The non-transitory computer-readable storage medium of claim 17, wherein the operations further comprise tracking the media endurance metric value over time as a program/erase cycle (PEC) value, and wherein
converting the media endurance metric value comprises using an MLC conversion factor to convert a PEC value for the second block from SLC-type PEC to MLC-type PEC; and
converting the second block to MLC memory comprises causing an MLC erase operation to be performed on the second block.

19. The non-transitory computer-readable storage medium of claim 17, wherein determining that the first block is a bad block comprises determining that the first block is one of a grown bad block or a manufactured bad block and that the second block is not a bad block.

20. The non-transitory computer-readable storage medium of claim 17, wherein the second block is a converted MLC block and the operations further comprise:

detecting an MLC block of the second subset has failed; and assigning the converted MLC block to be a target block for relocating data stored at the MLC block.

\* \* \* \* \*